United States Patent
McCoy et al.

(10) Patent No.: US 7,784,538 B2
(45) Date of Patent: Aug. 31, 2010

(54) USING AN ACOUSTIC PING AND SONIC VELOCITY TO CONTROL AN ARTIFICIAL LIFT DEVICE

(75) Inventors: Robert H. McCoy, Talala, OK (US); Dustin B. Campbell, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/259,003

(22) Filed: Oct. 27, 2008

(65) Prior Publication Data
US 2010/0101787 A1  Apr. 29, 2010

(51) Int. Cl.
E21B 47/00 (2006.01)
E21B 43/12 (2006.01)
E21B 43/00 (2006.01)
G01V 1/00 (2006.01)

(52) U.S. Cl. .................. 166/250.03; 166/250.15; 166/53; 166/370; 166/105; 166/372; 367/31; 367/33

(58) Field of Classification Search ............ 166/105, 166/65.1, 66.4, 371; 367/25, 28, 35, 83, 367/94, 86
See application file for complete search history.

(56) References Cited

U.S. PATENT DOCUMENTS

| | | | |
|---|---|---|---|
| 4,761,770 A | | 8/1988 | Kim et al. |
| 4,855,963 A * | | 8/1989 | Winbow et al. .......... 367/31 |
| 6,085,836 A * | | 7/2000 | Burris et al. .......... 166/250.03 |
| 6,672,163 B2 * | | 1/2004 | Han et al. .......... 73/597 |
| 6,712,138 B2 | | 3/2004 | Mandal |
| 6,851,444 B1 * | | 2/2005 | Kohl et al. .......... 137/13 |
| 6,909,666 B2 | | 6/2005 | Dubinsky et al. |
| 6,957,700 B2 | | 10/2005 | Mandal |
| 6,986,650 B2 * | | 1/2006 | West .......... 417/423.3 |
| 7,246,662 B2 * | | 7/2007 | Jabusch et al. .......... 166/250.15 |
| 2002/0096323 A1 | | 7/2002 | Burris et al. |
| 2004/0163806 A1 | | 8/2004 | Hadley |
| 2005/0190648 A1 | | 9/2005 | Tang et al. |
| 2006/0227665 A1 | | 10/2006 | Guion et al. |
| 2006/0235573 A1 | | 10/2006 | Guion |
| 2008/0175100 A1 * | | 7/2008 | Korneev et al. .......... 367/25 |

* cited by examiner

Primary Examiner—David J Bagnell
Assistant Examiner—James G. Sayre
(74) Attorney, Agent, or Firm—Bracewell & Giuliani LLP (57) ABSTRACT

A transmitter generates an acoustic ping in a fluid in a borehole, and a receiver monitors waves resulting from the acoustic ping. Responsive to the monitored waves, an attribute of the fluid is estimated, including a sonic velocity, a mixture of gas and oil, a mixture of water and oil, an amount of sand, an amount of gas, an amount of skin effect, or a depth of fluid. An operation of the artificial lift device is then controlled responsive to the estimated attribute. Alternately, a sonic velocity is estimated for the fluid through an analysis of a sample pumped to the surface or through an analysis of monitored waves. A depth of the fluid is calculated responsive to the estimated sonic velocity for the fluid in the borehole and the monitored T-waves. The operation of the artificial lift device is then controlled responsive to the calculated depth of fluid.

11 Claims, 5 Drawing Sheets

USING AN ACOUSTIC PING AND SONIC VELOCITY TO CONTROL AN ARTIFICIAL LIFT DEVICE

BACKGROUND

1. Field of the Invention

This invention relates in general to artificial lift devices and, in particular, to controlling an operation of an artificial lift device by monitoring waves resulting from an acoustic ping.

2. Description of the Prior Art

It is known in sonar and well logging technology to utilize an acoustic ping to estimate a distance to an object or a sonic velocity of a material. An acoustic ping is a pulse of sound, which is generated by a transmitter, is propagated as a wave through a medium, is typically reflected off an object or a change in propagation media, and then is collected by a receiver for analysis. An acoustic ping can also refer to a series of pulses. The sonic velocity of a material is the speed in which sound travels through the material (including sound having sonic, ultrasonic, or subsonic frequencies). The sonic velocity of a material can also be known as the velocity and as the ultrasonic velocity; it is affected by density and elasticity of the material. Sonic velocity is known to be a constant in a given material, and various concentrations of solutions can have different sonic velocities.

Various waves are well known in sonar and well logging technology. A P-wave is a wave in which particle motion is in the direction of source propagation. A P-wave is also called a compression wave, primary wave, pressure wave, or longitudinal wave. A S-wave, also called a shear wave or transverse wave, is a wave in which particle motion is perpendicular to the direction of propagation. In well logging technology, it is common to monitor the pressure "P" velocity, as well as shear "S" wave velocity, through a well formation to estimate the oil and water content. The T-wave, or tube wave, is the reflection from the top of the fluid or bottom of the well and is generally considered interference in well logging.

Ultrasonic flow meters are also known. An ultrasonic flow meter measures the velocity of a fluid (liquid or gas) in a pipe using acoustic sensors. One common type of ultrasonic flow meter is the transit-time flow meter, which works by measuring the "time of flight" difference between an acoustic ping sent in the flow direction and an acoustic ping sent opposite the flow direction. The time difference is a measure for the average velocity of the fluid along the path of the pings. By using the absolute transit time and the distance between the ultrasound transducers, the current speed of sound is easily found. Another type of ultrasonic flow meter measures the Doppler shift resulting in reflecting an acoustic ping off either small particles in the fluid, air bubbles in the fluid, or the flowing fluid's turbulence.

Today, downhole artificial lift devices typically use downhole pressure sensors to estimate a depth of fluid above an inlet of the device. Downhole artificial lift devices can include electrical submersible pump (ESP) assemblies, progressing cavity pump (PCP) assemblies, rod pumps, and downhole gas compressors. This prior art approach has numerous disadvantages. For example, pressure measurements can be unstable at the high temperatures of a well-bore environment. Also, in holes not drilled vertically, pressure measurements can provide imprecise estimates of the depth of fluid above a downhole artificial lift device. In addition, foam that accumulates on the well fluid surface provides another source of error.

SUMMARY OF THE INVENTION

In view of the foregoing, embodiments of the present invention beneficially utilize an acoustic ping to monitor a downhole environment and to control an operation of a downhole artificial lift device. According to example embodiments, a transmitter generates an acoustic ping in a fluid in a borehole, and one or more receivers monitor waves resulting from the acoustic ping, including, for example, T-waves, P-waves, and S-waves. Monitoring waves can include monitoring a phase shift and amplitude of the waves. Responsive to the monitored waves, an attribute of the fluid is estimated. The estimated attribute can include, for example, a sonic velocity, a mixture of gas and oil, a mixture of water and oil, an amount of sand, an amount of gas, an amount of skin effect, or a depth of fluid. An operation of the artificial lift device is then controlled responsive to the estimated attribute.

According to other example embodiments, a transmitter generates an acoustic ping in a fluid in a borehole, and one or more receivers monitor waves resulting from the acoustic ping, including, for example, T-waves, P-waves, and S-waves. Then a sonic velocity is estimated for the fluid in the borehole through either an analysis of a sample of fluid pumped to the surface of the borehole to estimate a mixture of oil and water or through an analysis of monitored waves resulting from the acoustic ping. A depth of the fluid, e.g., the depth above an inlet of an artificial lift device, is calculated responsive to the estimated sonic velocity for the fluid in the borehole and the monitored T-waves resulting from the acoustic ping. The operation of the artificial lift device, such as, an electrical submersible pump assembly, is then controlled responsive to the calculated depth of the fluid.

In additional example embodiments, a structure, such as, a stinger or an extension of tubing, can be extended below the artificial lift device into a perforations region of the borehole. The structure can have one or more receivers spaced apart along the structure, with at least one receiver being a known distance from the transmitter, to monitor P-waves resulting from the acoustic ping and to estimate a velocity for the P-waves in the borehole to thereby estimate one or more various attributes of the fluid in the borehole. The various attributes can include, for example, a mixture of gas and oil in the fluid in the borehole, a mixture of water and oil in the fluid in the borehole, a skin effect in perforations of the borehole, and a porosity of a formation.

In additional example embodiments, the acoustic ping generated by the transmitter can be coupled, directly or indirectly, into a formation to facilitate the propagation of S-waves (which do not travel well in liquids). An indirect coupling can involve, for example, propagation of the acoustic ping through well casing as understood by those skilled in the art. The one or more receivers can then monitor S-waves to estimate, for example, a slug or skin build up in the perforations of the borehole.

Embodiments advantageously provide, for example, for control of the operation of an artificial lift device, such as, an electrical submersible pump assembly, through a more accurate calculation of the depth of the fluid above an inlet of the artificial lift device. Calculations relying on pressure measurements can be unstable at the high temperatures of a well bore environment. Also, in boreholes not drilled vertically, pressure measurements can provide imprecise estimates of the depth of fluid above an artificial lift device. In addition, foam that accumulates on the well fluid surface provides another source of error for calculations relying on pressure measurements.

Other embodiments provide, for example, for estimating a specific gravity of the fluid in the borehole by measuring a pressure by a pressure sensor associated with the artificial lift device and relating the sonic velocity to the pressure to thereby estimate a specific gravity of the fluid in the borehole. In addition, example embodiments include further analysis. For example, responsive to changes in the monitored T-waves or P-waves, example embodiments can estimate a change in an amount of a depth of foam, an amount of sand in the fluid in the borehole, or an amount of gas in the fluid in the borehole.

Still other embodiments provide for an electrical submersible pump assembly, including a pump, a pump motor, a transmitter to generate an acoustic ping, one or more receivers to monitor waves resulting from the acoustic ping, and a processor in communication with the transmitter and the receiver. The electrical submersible pump assembly can include a computer program product which can cause the processor to perform operations, including, for example, calculating a depth of a fluid in the borehole and controlling an operation of the electrical submersible pump responsive to the calculated depth of fluid.

In addition, example embodiments may include other systems, program products, methods, and apparatuses of controlling the operation an artificial lift device utilizing an acoustic ping, as understood by those skilled in the art.

BRIEF DESCRIPTION OF THE DRAWINGS

Some of the features and benefits of the present invention having been stated, others will become apparent as the description proceeds when taken in conjunction with the accompanying drawings, in which.

DETAILED DESCRIPTION OF THE INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

An example embodiment provides a transducer, for example, a ceramic quartz, near the bottom of an artificial lift device, such as, an electrical submersible pump assembly, within a borehole. In one embodiment, the transducer is utilized as both a transmitter and receiver. The transducer is excited to oscillation, or "pinged," by a high voltage signal. The transducer transforms the high voltage signal into sound energy, generating an acoustic ping. The reflections of the sound waves are monitored and collected by a receiver, e.g., the transducer. Monitoring waves can include monitoring a phase shift and amplitude of the waves.

In an example embodiment, the first signal received in a borehole environment is typically the P-wave reflected from the casing surrounding the artificial lift device. A P-wave is a wave in which particle motion is in the direction of source propagation. A P-wave is also called a compression wave, primary wave, pressure wave, or longitudinal wave. Closely following the reflected P-wave, the second signals received are typically S-waves. An S-wave, also called a shear wave or transverse wave, is a wave in which particle motion is perpendicular to the direction of propagation. For S-wave propagation (which do not travel well in liquids), the acoustic ping generated by the transmitter can be coupled directly or indirectly, such as, through a well casing, into a formation. Next follows a T-wave, or tube wave. The tube wave will be a large signal crated by the velocity changes at the fluid level and characterized (filtered) as a lower frequency signal (i.e., 20 KHz transmitted may reflect the fluid level at 1 KHz). This can be filtered downhole by an analog or processor methods to estimate the time to the fluid surface. This time to the fluid surface correlated to a sonic velocity of the fluid will give a precise depth of the fluid above the sensor, i.e., the transducer. The depth of the fluid above the sensor, or alternately above the inlet of the artificial lift device, is then utilized to control the operation of the artificial lift device. For example, the artificial lift device can be shut down if there is insufficient depth of fluid. Thus, an acoustic ping, or signal, is generated and monitored to directly control the operation of an artificial lift device.

The sonic velocity of a material is the speed in which sound travels through the material. It is affected by density and elasticity of the material. Sonic velocity is known to be a constant in a given material, and various concentrations of solutions can have different sonic velocities. For example, increasing an amount of gas in gas-oil mixture affects the sonic velocity.

In an example embodiment, estimating a sonic velocity for the fluid in the borehole can involve analyzing a sample of fluid pumped to the surface of the borehole to thereby estimate a mixture of oil and water in the fluid in the borehole. For a given mixture of oil and water, the sonic velocity is a constant.

In an alternative example embodiment, estimating a sonic velocity for the fluid in the borehole can involve, for a quiescent well having a layer of water and a layer of oil above the sensor, a processor analyzing the monitored T-wave reflections of the acoustic ping generated by a water-oil transition and an oil-air transition so that processor acts as a water-oil sensor. In this embodiment, calculating a depth of the fluid can involve, for example, calculating a depth of water and calculating a depth of oil on top of the water. That is, the monitored reflections include a T-wave indicating the water-oil transition and a second T-wave indicating an oil-air transition. In addition, example embodiments further include a processor analyzing the monitored T-wave reflections of the acoustic ping generated by one or more transitions between media so that processor acts as a sensor detecting one or more transitions between media. The media can include any combination of water, oil, air, gas, foam, chemicals, and other fluids which exist in a downhole environment. Other embodiments can involve, for example, utilizing two receivers and one transmitter so that the T-wave reflection from the bottom of the borehole can be eliminated when estimating the distance to the fluid surface above the pump. As understood by those skilled in the art, two receivers spaced apart allow for the determination of the direction of the T-wave.

In another alternative example embodiment, estimating a sonic velocity for the fluid in the borehole can include extending a structure below the artificial lift device into a perforations region of the borehole, where the perforations region of the borehole include one or more producing zones. The structure can be, for example, a stinger or an extension of tubing; the structure can be associated with one or more receivers spaced apart along the structure. And at least one receiver of the one or more receivers can be a known distance from the transmitter. The receivers associated with the extended structure can monitor the P-waves resulting from the acoustic ping. Estimating a sonic velocity for a fluid in the borehole can include calculating the sonic velocity responsive to the monitored P-waves, for example, by calculating a Doppler shift or by measuring a time of flight difference for monitored P-waves as understood by those skilled in the art. That is, by knowing the distance traveled from the transmitter to a receiver and monitoring a P-wave to estimate the time the P-wave travels from the transmitter to the receiver, a processor can estimate the velocity for the P-wave. (As such, the transmitter and receiver can be in communication with a time reference and also in communication with a processor.) Then the estimated velocity for the P-waves can be utilized to estimate various characteristics or attributes of the fluid in the borehole. These attributes can include, for example, a mixture of gas and oil in the fluid in the borehole, a mixture of water and oil in the fluid in the borehole, a skin effect in perforations of the borehole, and a porosity of a formation.

Example embodiments also provide the acoustic ping generated by the transmitter being coupled, directly or indirectly, into a formation to facilitate the propagation of S-waves (which do not travel well in liquids). An indirect coupling can involve, for example, propagation of the acoustic ping through well casing as understood by those skilled in the art. The one or more receivers can then monitor S-waves to estimate attributes of the fluid in the borehole, of the formation, or of the downhole environment, such as, for example, a slug or skin build up in the perforations of the borehole.

In addition, example embodiments include further analysis. For example, responsive to changes in the monitored T-waves or P-waves, embodiments can estimate a change in an amount of a depth of foam, an amount of sand in the fluid in the borehole, or an amount of gas in the fluid in the borehole. For example, the presence of gas in the fluid in the borehole will cause the amplitude of the T-waves or P-waves to decrease and the velocity to decrease. The presence of sand in the fluid of the borehole will cause the amplitude of the T-waves or P-waves to decrease and the velocity to increase.

Advantages of the embodiments for control of the operation of an artificial lift device include, for example, a more accurate calculation of the depth of the fluid above the artificial lift device. Calculations relying on pressure measurements can be unstable at the high temperatures of a well bore environment. Also, in boreholes not drilled vertically, pressure measurements can provide imprecise estimates of the depth of fluid above a downhole artificial lift device. In addition, foam that accumulates on the well fluid surface provides another source of error. Other advantages include providing in real time a more accurate characterization of the fluid in the borehole, of the downhole environment, or of the formation for maintenance and operation purposes.

Other embodiments provide, for example, for estimating a specific gravity of the fluid in the borehole by measuring a pressure by a pressure sensor associated with the artificial lift device and relating the sonic velocity to the pressure to thereby estimate specific gravity of the fluid in the borehole.

Example embodiments also provide for injecting chemicals into the fluid in the borehole responsive to the estimated one or more attributes of the fluid in the borehole. In an increase in a skin effect in perforations of the borehole, as estimated, for example, by analysis of P-waves, an example embodiment can provide for injecting asphaltine dissolving chemicals. Or if a depth of the fluid (or foam) is increasing in a gas well, as estimated, for example, by analysis of T-waves, an example embodiment can provide for injecting more surfactant chemicals.

Figure 1:
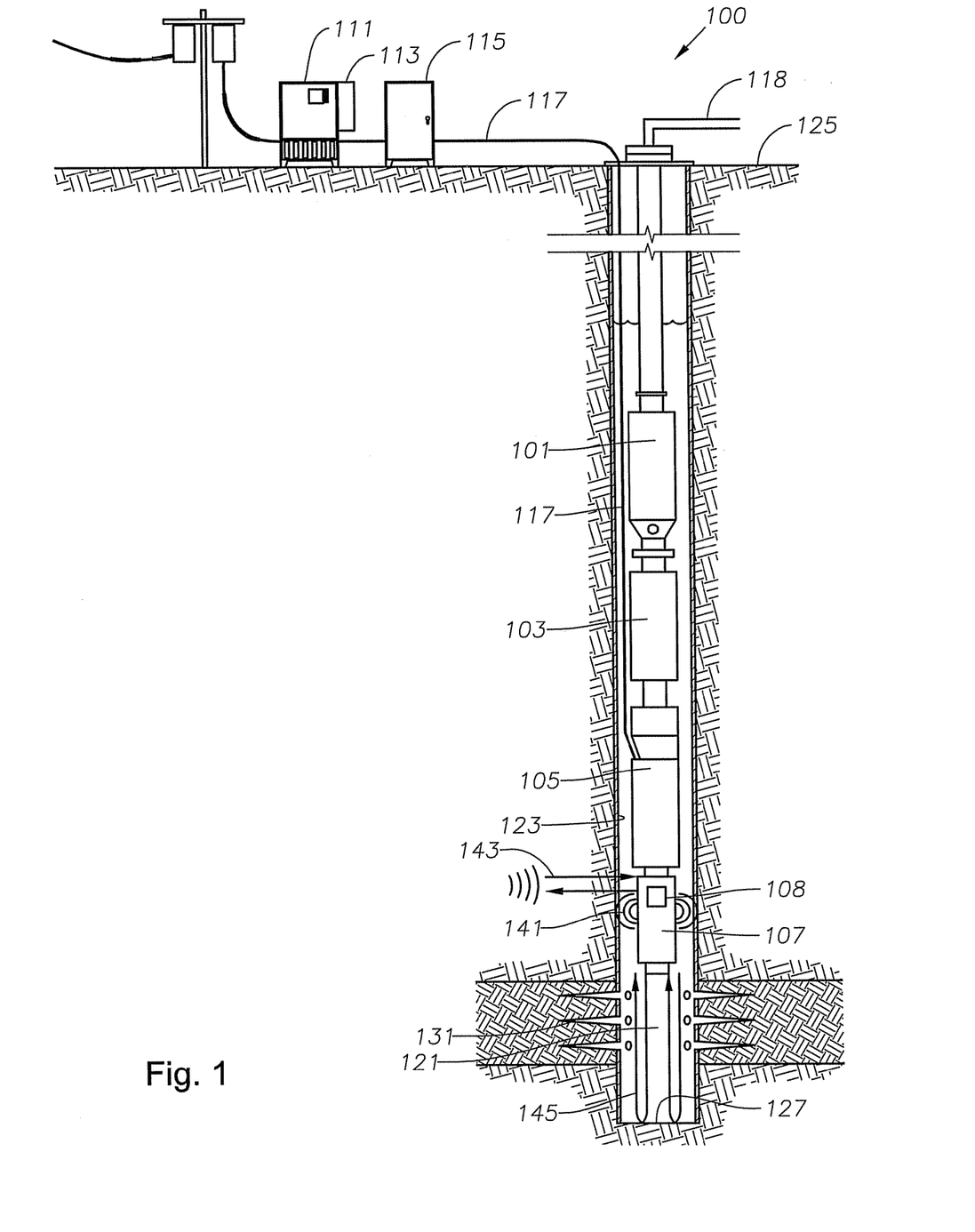
FIG. 1 is a block diagram of an electrical submersible pump assembly according to an example embodiment.

With reference now to FIG. 1, an example embodiment of an electrical submersible pump system 100 includes a centrifugal pump 101, a pump motor 105, and a seal assembly 103 located between the pump 101 and motor 105. The pump 101, seal assembly 103, and motor 105 are located within a borehole 121, inside a standard well casing 123. The ESP system 100 further includes a variable speed drive 111, a controller 113, and an optional transformer 115 located on the surface 125. A three-phase power cable 117 provides power and communications between the variable speed drive 111 (or optional transformer 115) and the pump motor 105. The variable speed drive 111 can operate as a power source by providing electrical power for driving the motor 105. The cable 117 typically extends thousands of feet and thereby introduces significant electrical impedance between the variable speed drive 111 (or optional transformer 115) and the pump motor 105. By altering the output voltage and frequency of the variable speed drive 111, the controller 113 associated with the variable speed drive 111 controls the voltage at motor 105 terminals, and thus the operation of the pump.

With further reference now to FIG. 1, an example embodiment of an electrical submersible pump system 100 further includes a transducer 107, such as, for example, a ceramic quartz, within the borehole. In one embodiment, the transducer 107 is utilized as a transmitter and receiver. The transducer 107 generates an acoustic ping, including P-waves 141 and S-waves 143. The waves can travel through perforations 131 beyond the borehole 121. The generated acoustic ping further includes T-waves 145, or tube waves, including a T-wave reflection from the bottom 127 of the borehole. A processor 108 associated with the electrical submersible pump can be positioned to communicate with the transducer, to calculate a depth of fluid above an inlet of the ESP responsive to monitored T-waves, and to control the operation of the pump.

Figure 2:
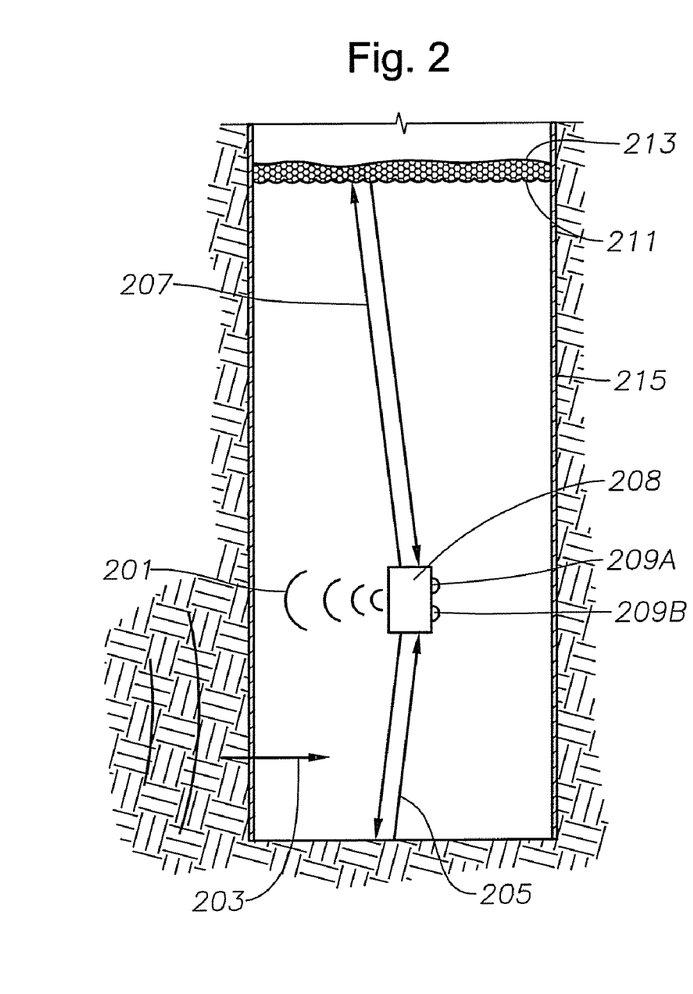
FIG. 2 is a block diagram of P-waves, S-waves, and T-waves according to an example embodiment.

With reference to now to FIG. 2, an example embodiment includes a transmitter 208 and two receivers 209A, 209B, all in communication with a time reference. The transmitter 208 and receivers 209A, 209B can, for example, all be associated with an artificial lift device (not shown) located within a borehole. The transmitter 208 generates an acoustic ping, including P-waves 201 and S-waves 203. The generated acoustic ping further includes T-waves, or tube waves, including a T-wave reflection from the bottom of the borehole 205 and a T-wave reflection from top of the fluid 207. The use of two receivers spaced apart 209A, 209B allows for the determination of the direction of the T-wave so that the T-wave reflection from the bottom of the borehole can be eliminated when estimating the distance to the fluid surface above the electrical submersible pump assembly. In an example embodiment as shown, a layer of foam 213 can also exist on top of the fluid level in the well 211.

Figure 3:
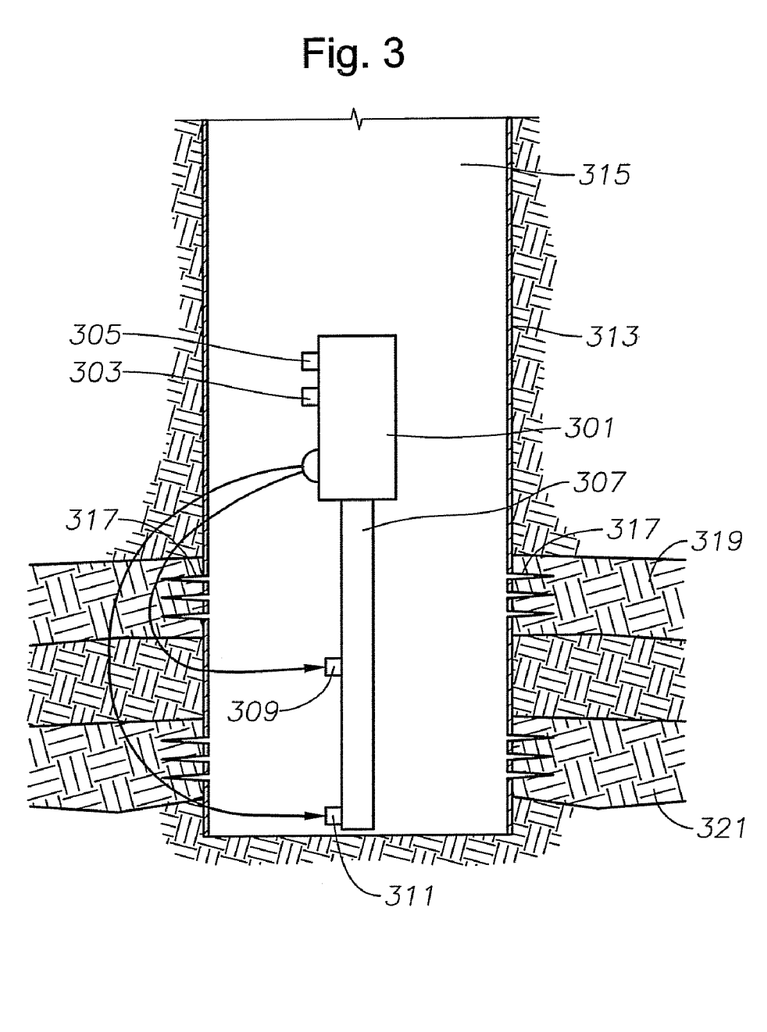
FIG. 3 is block diagram of P-waves and a stinger extended into a perforations region of the borehole according to an example embodiment.

With reference to now to FIG. 3, an example embodiment includes a transmitter 301 and two receivers 303, 305, all in communication with a time reference. The transmitter 301 can be associated, for example, with an artificial lift device (not shown) located within a borehole 315. The example embodiment also includes a structure 307, e.g., a stinger or extension of tubing, extended below the artificial lift device (not shown) into a perforations 317 region of the borehole, which includes one or more producing zones 319, 321. The structure 307 can be associated with one or more receivers 309, 311 spaced apart along the structure to monitor P-waves resulting from an acoustic ping generated by the transmitter 301 and to estimate a velocity for the P-waves in the borehole responsive to the monitored P-waves.

Figure 4:
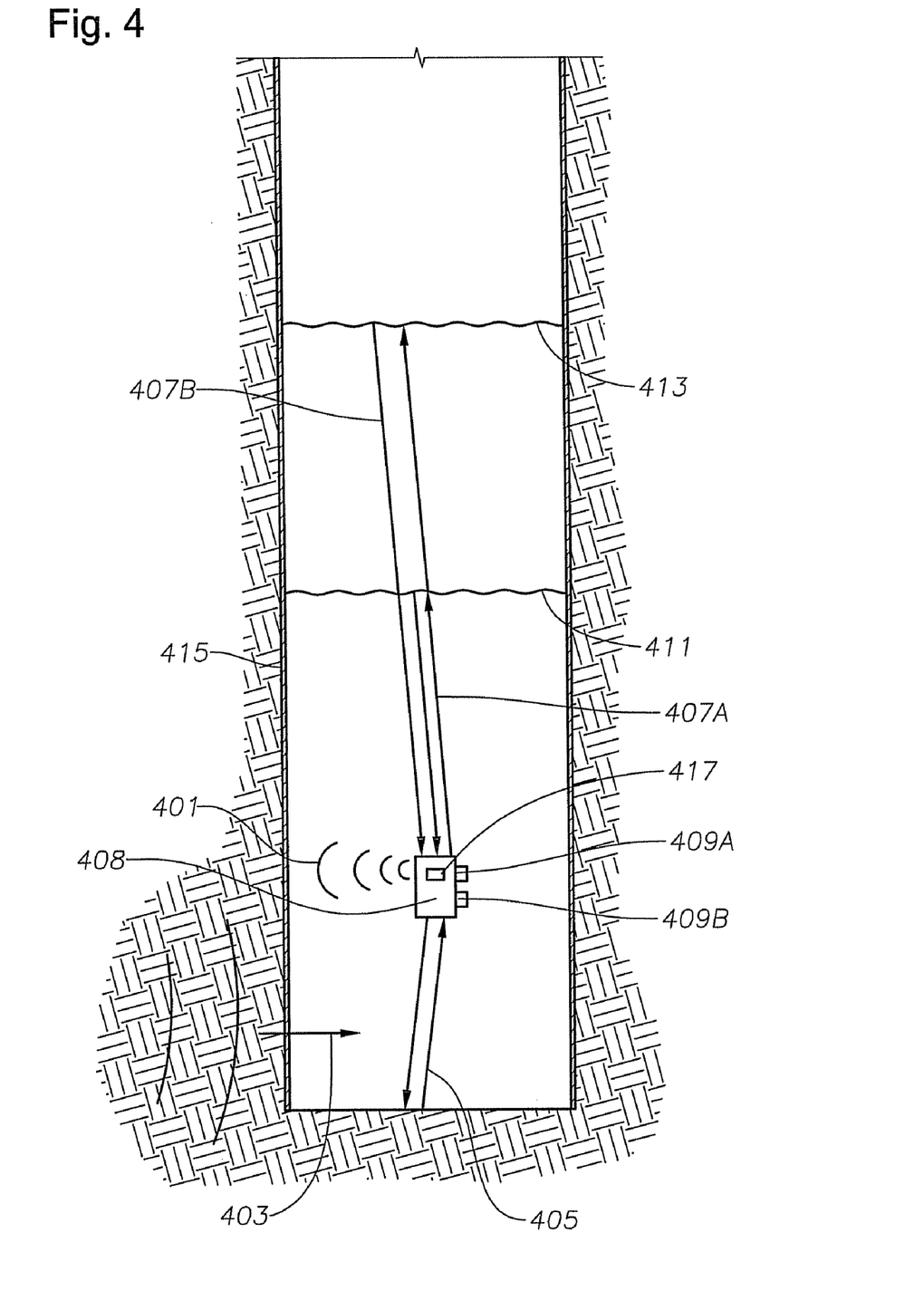
FIG. 4 is block diagram of P-waves, S-waves, and T-waves in a quiescent well according to an example embodiment.

With reference to now to FIG. 4, an example embodiment includes a transmitter 408 and two receivers 409A, 409B, all in communication with a time reference and associated with an artificial lift device (not shown) located within a borehole of a quiescent well. The quiescent well can include a water-oil transition 411 and also a water-air transition 413. The transmitter 408 generates an acoustic ping, including P-waves 401 and S-waves 403. The generated acoustic ping further includes a T-wave reflection 407A due to the water-oil transition 411 and also a T-wave reflection 407B due to the water-air transition 413. The generated acoustic ping also includes a T-wave reflection from the bottom of the borehole 405. The use of two receivers spaced apart 409A, 409B allows for the determination of the direction of the T-wave so that the T-wave reflection from the bottom of the borehole can be eliminated when estimating the distance to the fluid surface above the artificial lift device.

Figure 5:
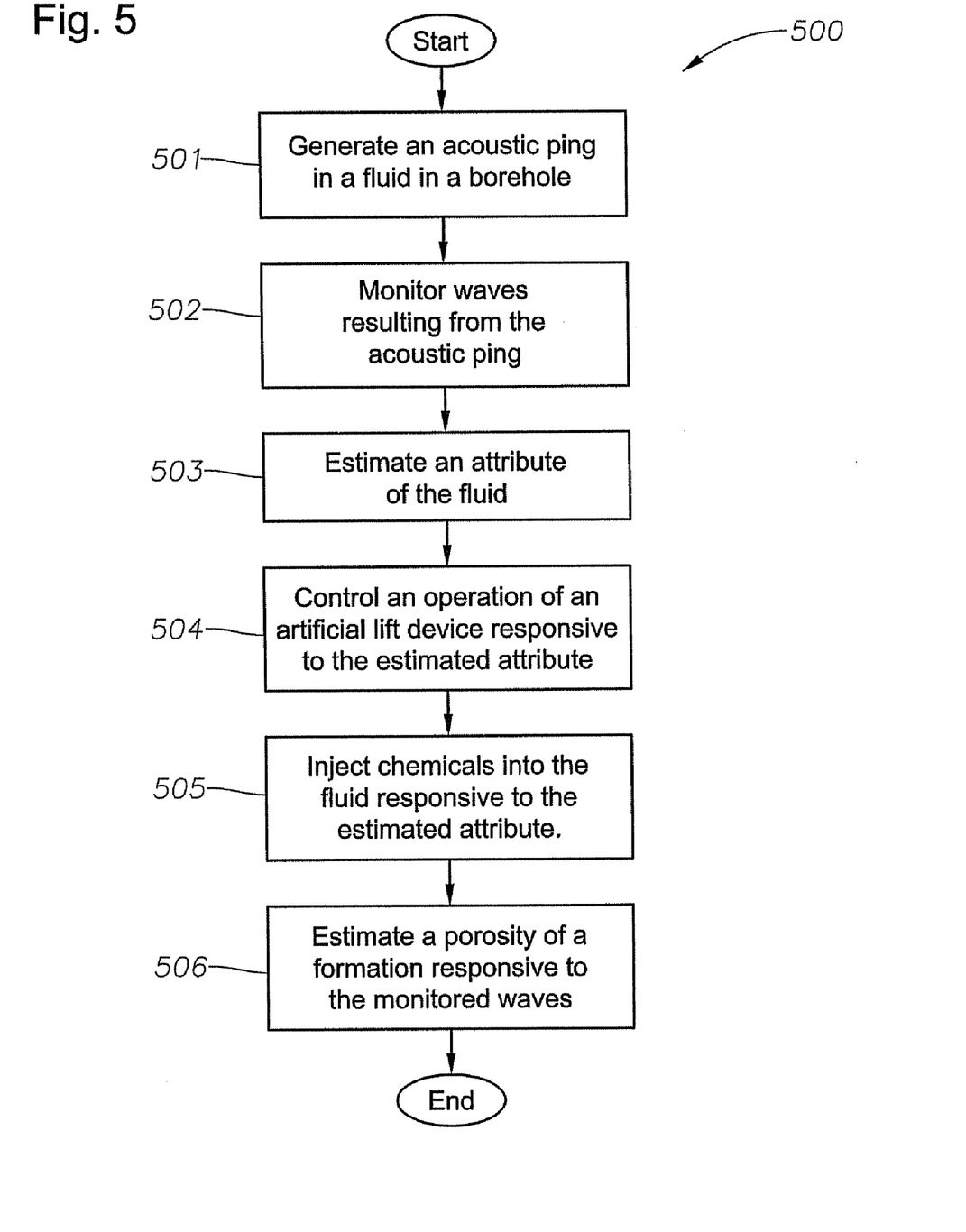
FIG. 5 is a flow diagram of a method of operating a pump of an artificial lift device according to an example embodiment.

With reference to now to FIG. 5, an example embodiment includes a method 500 of operating an artificial lift device utilizing an acoustic ping. The method can include generating an acoustic ping in a fluid in a borehole 501 by a downhole transmitter in communication with a time reference. The method can include monitoring waves resulting from the acoustic ping 502 by one or more downhole receivers in the borehole. The one or more receivers can be in communications with the time reference. The method can include estimating one or more of the attributes of the fluid in the borehole 503 responsive to the monitored waves. The attributes can include a sonic velocity, a mixture of gas and oil, a mixture of water and oil, an amount of sand, an amount of gas, an amount of skin effect, and a depth of fluid. The method can include controlling an operation of an artificial lift device responsive to the estimated one or more attributes of the fluid in the borehole 504. The method can also include injecting chemicals into the fluid in the borehole responsive to the estimated one or more attributes of the fluid in the borehole 505. The method can also include estimating a porosity of a formation responsive to the monitored waves 506.

Figure 6:
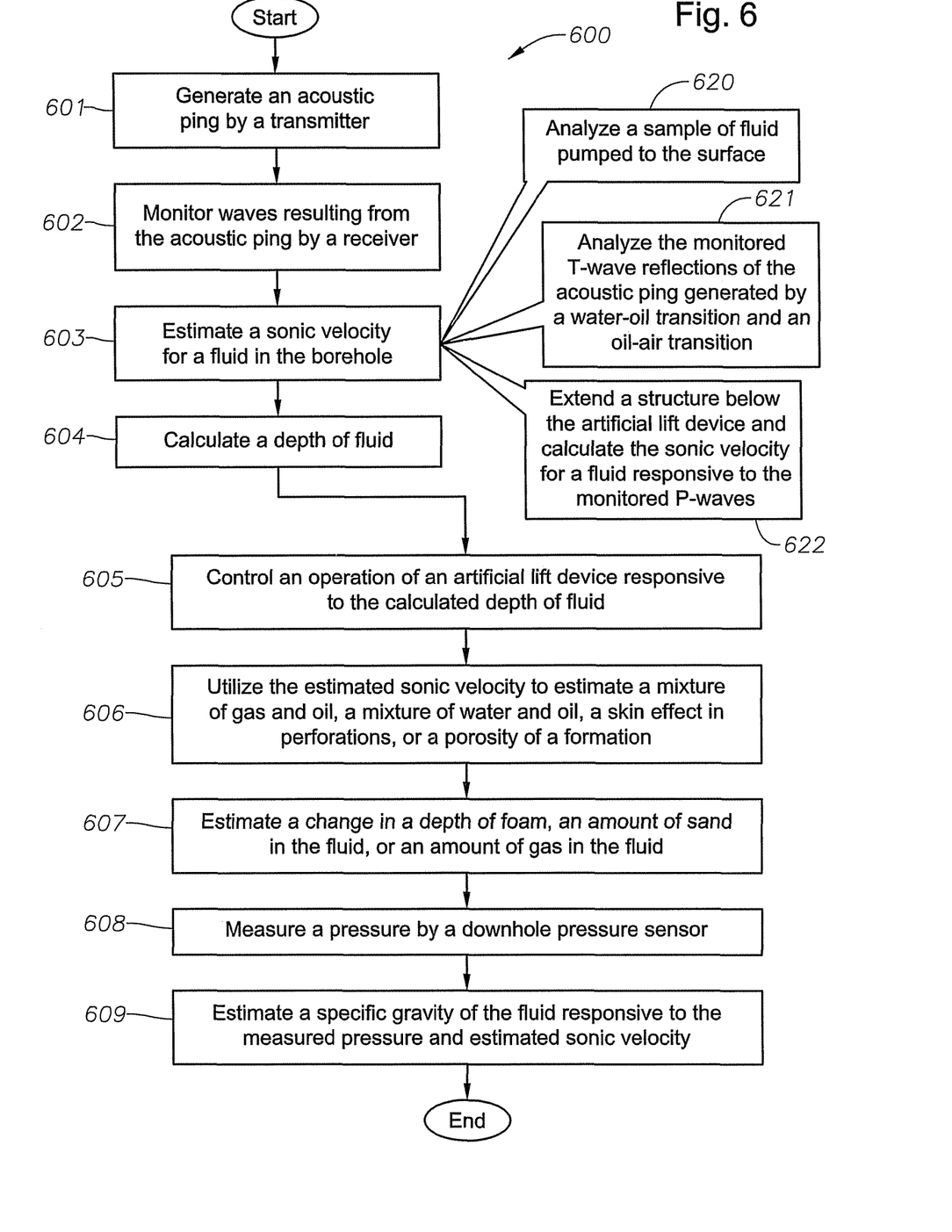
FIG. 6 is a flow diagram of a method of operating an artificial lift device according to another example embodiment.

With reference to now to FIG. 6, an example embodiment includes a method 600 of operating an artificial lift device utilizing an acoustic ping. The method can include generating an acoustic ping in a fluid in a borehole by a downhole transmitter 601 in communication with a time reference. The method can include monitoring waves resulting from the acoustic ping by one or more downhole receivers 602 in communications with the time reference. The waves can include a T-wave. The method can include estimating a sonic velocity for the fluid in the borehole 603. In one embodiment, the sonic velocity for the fluid in the borehole is estimated by analyzing a sample of fluid pumped to the surface of the borehole 620 to thereby estimate a mixture of oil and water in the fluid in the borehole. In an alternative embodiment, the sonic velocity for the fluid in the borehole is estimated by analyzing the monitored T-wave reflections of the acoustic ping generated by a water-oil transition and an oil-air transition 621. In addition, example embodiments further include analyzing the monitored T-wave reflections of the acoustic ping generated by one or more transitions between media so that processor acts as a sensor detecting one or more transitions between media. The media can include any combination of water, oil, air, gas, foam, chemicals, and other fluids which exist in a downhole environment. In another alternative example embodiment, the sonic velocity for the fluid in the borehole is estimated by extending a structure below the artificial lift device into a perforations region of the borehole and calculating the sonic velocity responsive to the monitored P-waves 622. The method can include calculating a depth of the fluid 604 responsive to the estimated sonic velocity for the fluid in the borehole and monitored T-waves resulting from the acoustic ping. The method can include controlling an operation of an artificial lift device responsive to the calculated depth of the fluid 605. The method can include utilizing the estimated sonic velocity to estimate one or more of the following: a mixture of gas and oil in the fluid in the borehole, a mixture of water and oil in the fluid in the borehole, a skin effect in perforations of the borehole, and a porosity of a formation 606. The method can include estimating a change in one or more of the following, responsive to changes in an amplitude and a phase shift of the monitored P-waves: a depth of foam, an amount of sand in the fluid in the borehole, and an amount of gas in the fluid in the borehole 607. The method can include measuring a pressure by a pressure sensor 608 and estimating a specific gravity of the fluid in the borehole 609, responsive to the measured pressure and the estimated sonic velocity for the fluid in the borehole.

Example embodiments also provide for an electrical submersible pump assembly, including a an electrical submersible pump located in a borehole, a pump motor attached to the electrical submersible pump, a transmitter positioned to generate an acoustic ping, one or more receivers positioned to monitor waves resulting from the acoustic ping, and a processor in communication with the transmitter and the receiver. The electrical submersible pump assembly can include a computer program product associated with the processor, stored on a tangible computer readable memory media, and operable on a computer, the computer program product comprising a set of instructions that, when executed by the processor, cause the control device to perform the various operations. The operations can include calculating a depth of a fluid in the borehole responsive to monitored T-waves resulting from the acoustic ping and an estimated sonic velocity for the fluid and controlling an operation of the electrical submersible pump responsive to the calculated depth of fluid. The operations can also include utilizing the estimated sonic velocity to estimate one or more of the following: a mixture of gas and oil in the fluid in the borehole, a mixture of water and oil in the fluid in the borehole, a skin effect in perforations of a borehole, and a porosity of a formation. The operations can also include estimating a change in one or more of the following, responsive to changes in an amplitude and a phase shift of the monitored P-waves: a depth of foam, an amount of sand in the fluid in the borehole, and an amount of gas in the fluid in the borehole.

It is important to note that while embodiments of the present invention have been described in the context of a fully functional electrical submersible pump assembly and related methods, those skilled in the art will appreciate that the mechanism of the present invention and/or aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication liniks. For example, such media can include both operating instructions and/or instructions related to the embodiments described above.

Many modifications and other embodiments of the invention will come to the mind of one skilled in the art having the benefit of the teachings presented in the foregoing descriptions and the associated drawings. In the drawings and specification, there have been disclosed illustrative embodiments of the invention and, although specific terms are employed, they are used in a generic and descriptive sense only and not for the purpose of limitation. Therefore, it is to be understood that the invention is not to be limited to the illustrated embodiments disclosed, and that modifications and other embodiments are intended to be included within the scope of the appended claims.

We claim:

1. A method of operating an artificial lift device utilizing an acoustic ping, the method comprising:
   generating an acoustic ping in a fluid in a borehole by a downhole transmitter, the transmitter being in communication with a time reference;
   monitoring waves resulting from the acoustic ping by one or more downhole receivers in the borehole, the waves including a T-wave, the one or more downhole receivers being in communications with the time reference;
   estimating a sonic velocity for the fluid in the borehole, including analyzing a sample of fluid pumped to the surface of the borehole to thereby estimate a mixture of oil and water in the fluid in the borehole;
   calculating a depth of the fluid responsive to the estimated sonic velocity for the fluid in the borehole and monitored T-waves resulting from the acoustic ping; and
   controlling an operation of an artificial lift device responsive to the calculated depth of the fluid.

2. A method of operating an artificial lift device utilizing an acoustic ping, the method comprising:
   generating an acoustic ping in a fluid in a borehole by a downhole transmitter, the transmitter being in communication with a time reference;
   monitoring waves resulting from the acoustic ping by one or more downhole receivers in the borehole, the waves including a T-wave, the one or more downhole receivers being in communications with the time reference;
   estimating a sonic velocity for the fluid in the borehole, including a processor analyzing the monitored T-wave reflections of the acoustic ping generated by a water-oil transition and an oil-air transition so that processor acts as a water-oil sensor;
   calculating a depth of the fluid responsive to the estimated sonic velocity for the fluid in the borehole and monitored T-waves resulting from the acoustic ping, including calculating a depth of water and calculating a depth of oil on top of the water; and
   controlling an operation of an artificial lift device responsive to the calculated depth of the fluid.

3. A method of operating an artificial lift device utilizing an acoustic ping, the method comprising:
   generating an acoustic ping in a fluid in a borehole by a downhole transmitter, the transmitter being in communication with a time reference;
   monitoring waves resulting from the acoustic ping by one or more downhole receivers in the borehole, the waves including a T-wave and P-waves, the one or more downhole receivers being in communications with the time reference, including extending a structure below the artificial lift device into a perforations region of the borehole, the structure associated with the one or more receivers, at least one receiver of the one or more receivers being a known distance from the transmitter;
   estimating a sonic velocity for the fluid in the borehole, including calculating the sonic velocity responsive to the monitored P-waves;
   calculating a depth of the fluid responsive to the estimated sonic velocity for the fluid in the borehole and monitored T-waves resulting from the acoustic ping; and
   controlling an operation of an artificial lift device responsive to the calculated depth of the fluid.

4. A method of claim 3, further comprising utilizing the estimated sonic velocity to estimate one or more attribute selected from a group consisting of: a mixture of gas and oil in the fluid in the borehole, a mixture of water and oil in the fluid in the borehole, a skin effect in perforations of the borehole, and a porosity of a formation.

5. A method of claim 3, further comprising, responsive to changes in an amplitude and a phase shill of the monitored P-waves, estimating a change in an attribute selected from a group consisting of: a depth of foam, an amount of sand in the fluid in the borehole, and an amount of gas in the fluid in the borehole.

6. A method of claim 3, further comprising:
   measuring a pressure by a downhole pressure sensor; and
   estimating a specific gravity of the fluid in the borehole responsive to the measured pressure and the estimated sonic velocity for the fluid in the borehole.

7. A method of claim 3, wherein waves resulting from the acoustic ping include P-waves, and wherein the step of estimating a sonic velocity for the fluid in the borehole involves measuring a time of flight difference for monitored P-waves.

8. A method of operating an artificial lift device utilizing an acoustic ping, the method comprising:
   generating an acoustic ping in a fluid in a borehole by a downhole transmitter, the transmitter being in communication with a time reference;
   monitoring waves resulting from the acoustic ping by one or more downhole receivers in the borehole, the waves including a T-wave, the one or more downhole receivers being in communications with the time reference;
   estimating a sonic velocity for the fluid in the borehole, including a processor analyzing the monitored T-wave reflections of the acoustic ping generated by one or more transitions between media so that processor acts as a sensor detecting one or more transitions between media;
   calculating a depth of the fluid, including calculating a depth of the fluid above an inlet of the artificial lift device and also calculating a depth of one or more media responsive to the estimated sonic velocity for the fluid in the borehole and monitored T-waves resulting from the acoustic ping; and
   controlling an operation of an artificial lift device responsive to the calculated depth of the fluid.

9. A method of operating an artificial lift device utilizing an acoustic ping, the method comprising:

generating an acoustic ping in a fluid in a borehole by a downhole transmitter, the transmitter being in communication with a time reference;

monitoring waves resulting from the acoustic ping by one or more downhole receivers in the borehole, the waves including a T-wave, the one or more downhole receivers being in communications with the time reference;

estimating a sonic velocity for the fluid in the borehole, including calculating a Doppler shift;

calculating a depth of the fluid responsive to the estimated sonic velocity for the fluid in the borehole and monitored T-waves resulting from the acoustic ping; and controlling an operation of an artificial lift device responsive to the calculated depth of the fluid.

10. An electrical submersible pump assembly, comprising:

an electrical submersible pump located in a borehole;

a pump motor attached to the electrical submersible pump;

a transmitter positioned to generate an acoustic ping;

one or more receivers positioned to monitor waves resulting from the acoustic ping, the waves including T-waves and P-waves;

a structure extended below the artificial lift device into a perforations region of the borehole, the structure associated with the one or more receivers, at least one receiver of the one or more receivers being a known distance from the transmitter;

a processor in communication with the transmitter and the receiver; and a computer program product associated with the processor, stored on a tangible computer readable memory media, and operable on a computer, the computer program product comprising a set of instructions that, when executed by the processor, cause the processor to perform the operations of:

estimating a sonic velocity for the fluid in the borehole. including calculating the sonic velocity responsive to the monitored P-waves, calculating a depth of a fluid in the borehole responsive to monitored T-waves resulting from the acoustic ping and an estimated sonic velocity for the fluid, and controlling an operation of the electrical submersible pump responsive to the calculated depth of fluid.

11. An electrical submersible pump assembly, comprising:

an electrical submersible pump located in a borehole;

a pump motor attached to the electrical submersible pump;

a transmitter positioned to generate an acoustic ping;

one or more receivers positioned to monitor waves resulting from the acoustic ping, the waves including T-waves;

a processor in communication with the transmitter and the receiver; and a computer program product associated with the processor, stored on a tangible computer readable memory media, and operable on a computer, the computer program product comprising a set of instructions that, when executed by the processor, cause the processor to perform the operations of:

estimating a sonic velocity for the fluid in the borehole, including the processor analyzing the monitored T-wave reflections of the acoustic ping generated by one or more transitions between media so that processor acts as a sensor detecting one or more transitions between media, calculating a depth of a fluid in the borehole responsive to monitored T-waves resulting from the acoustic ping and an estimated sonic velocity for the fluid, including calculating a depth of the fluid above an inlet of the artificial lift device and also calculating a depth of one or more media, and controlling an operation of the electrical submersible pump responsive to the calculated depth of fluid.

* * * * *